US005559663A

United States Patent [19]

Tanaka et al.

[11] Patent Number: 5,559,663

[45] Date of Patent: Sep. 24, 1996

[54] SURGE ABSORBER

[75] Inventors: Yoshiyuki Tanaka; Masatoshi Abe; Taka-aki Ito, all of Saitama, Japan

[73] Assignee: Mitsubishi Materials Corporation, Tokyo, Japan

[21] Appl. No.: 507,972

[22] Filed: Jul. 27, 1995

Related U.S. Application Data

[63] Continuation of Ser. No. 37,297, Mar. 26, 1993, abandoned.

[30] Foreign Application Priority Data

Mar. 31, 1992 [JP] Japan .................................... 4-106062

[51] Int. Cl.[6] ........................................ H02H 1/00

[52] U.S. Cl. .......................... 361/127; 361/118; 361/120

[58] Field of Search .................................. 361/127, 126, 361/117, 118, 119, 120; 337/20, 34; 338/21, 24, 30

[56] References Cited

U.S. PATENT DOCUMENTS 4,240,124 12/1980 Westrom ................................ 361/127
4,910,632 3/1990 Shiga et al. ............................ 361/127

*Primary Examiner*—Jeffrey A. Gaffin
*Assistant Examiner*—Sally C. Medley
*Attorney, Agent, or Firm*—Thomas R. Morrison; Christopher R. Pastel

[57] ABSTRACT

A gap-type surge absorbing element and a varistor are assembled end to end in an insulating tube to form a compact surge absorber. Electrodes on the two devices contact a intermediate element to provide electrical connection therebetween. End electrodes seal the insulating tube and provide external connection to the outboard ends of the two devices, thereby putting them in series. The interior of the insulating tube is filled with an inert gas. Embodiments are described using microgap-type and gap-type surge absorbing elements.

9 Claims, 3 Drawing Sheets

SURGE ABSORBER

This is a continuation of application Ser. No. 08/037,297 filed on Mar. 26, 1993, now abandoned.

BACKGROUND OF THE INVENTION

1. Field of the Invention

The present invention relates to a surge absorber used for protecting an electronic component connected to a circuit receiving an abnormally high AC voltage or DC voltage. More particularly, the present invention relates to a surge absorber comprising an integrated gap-type surge absorbing element and a varistor.

2. Description of the Related Art

Gap-type surge absorbing elements are broadly classified into microgap-type discharge tubes and gap-type discharge tubes. A microgap-type discharge tube has a columnar ceramic body having micro gaps formed on the circumferential surface thereof covered with a conductive film. A pair of cap electrodes, with lead wires, cap the hot ends of the ceramic body. An insulating tube contains therein the ceramic body and the cap electrodes. The insulating tube is sealed after being filled with an inert gas. A gap-type discharge tube comprises a gas-filled insulating tube having a pair of electrodes sealing the opposed ends of the tube. The electrodes form a gap that is bridged by plasma when high voltage is applied between the electrodes.

These gap-type surge absorbing elements, having a high insulation resistance, are characterized by a low level of leakage current. Current may continue to flow through the low-impedance plasma path established by the surge voltage between the terminal electrodes after the completion of surge discharge driven by the relatively low source voltage of the circuit being protected. This is called the follow current.

On the other hand, a semiconductor type surge absorbing element using, for example, a zinc oxide varistor, does not rely on plasma conducting for discharging a surge. Thus, such a semiconductor type surge absorbing element does not suffer from follow current. However, a semiconductor type surge absorbing element has the drawback that its leakage current increases at high temperature. To avoid this inconvenience, the zinc oxide varistor may be resin-molded. To take advantage of the properties of both types of devices, semiconductor type surge absorbing elements may be used in combination with a gas discharge surge absorbing element.

Referring to FIG. 3, a prior-art method for producing a combination surge protector includes electrically connecting a lead wire 2 of a gap-type surge absorbing element 1 in series with a lead wire 4 of a varistor 3 using a connecting member 5 such as, for example, a metallic clamp. A case 6, about gap-type surge absorbing element 1 and varistor 3 may conveniently be filled with resin, with lead wires 2 and 4 extending outward therefrom for connection into a circuit (not shown).

The foregoing combination surge absorber requires pre-assembling gap-type surge absorbing element 1 and varistor 3 in series using connecting member 5 to join their lead wires 2 and 4. Then, the preassembly is placed in case 6 which is then filled with resin. The result is an inconvenient and complicated manufacturing process. A further disadvantage of this method is that gap-type surge absorbing element 1 and varistor 3 cannot be integrally combined into a compact form, and therefore require a relatively large case 6 to contain them.

Alternatively, when a wide enough space is available on a printed circuit board (not shown) gap-type surge absorbing element 1 and varistor 3 may be mounted directly on the print circuit board and connected in series by wiring on the circuit board.

Individual mounting of the gap-type surge absorbing element 1 and varistor 3 on the print circuit board leads to a high packaging cost and poses the problem that its use is limited to applications where a wide packaging space is available.

OBJECTS AND SUMMARY OF THE INVENTION

It is an object of the invention to provide a surge absorber which overcomes the drawbacks of the prior art.

It is a further object of the present invention to provide a surge absorber which prevents follow current and leakage current, and permits integral combination of a gap-type surge absorbing element and a varistor into a compact form.

To achieve the above-mentioned objects, the present invention places a gap-type surge absorbing element end-to-end with a varistor in an inert-gas-filled tube, without using intermediate leads. The ends of the gap-type surge absorbing element and the varistor make contact with end electrodes covering and sealing the ends of the tube. An intermediate electrode is preferably interposed between the gap-type surge absorbing element and the varistor to discourage the propagation of discharge within the tube from the gap of the gap-type surge absorbing element to the surface of the varistor.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
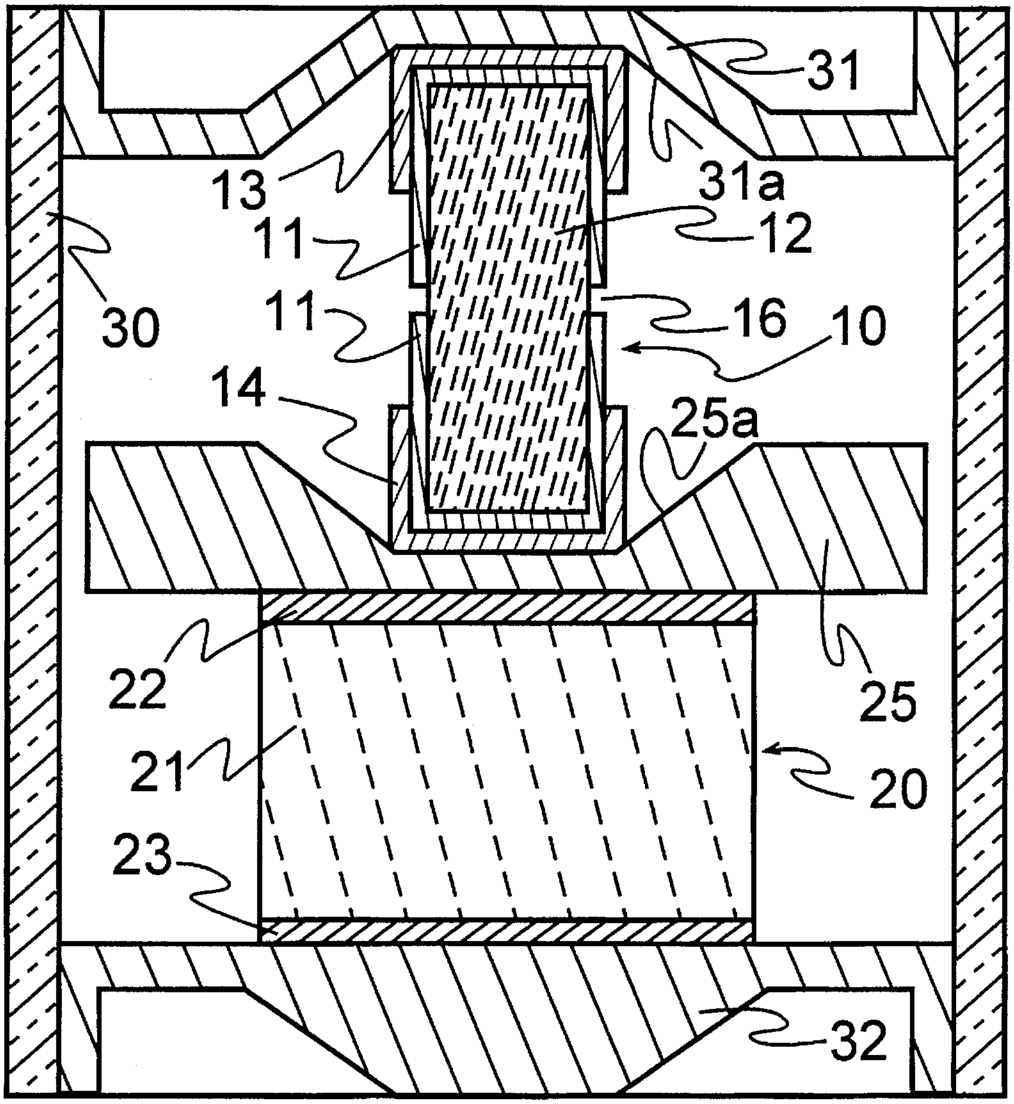
FIG. 1 is a cross section of a surge absorber according to an embodiment of the present invention.
Figure 2:
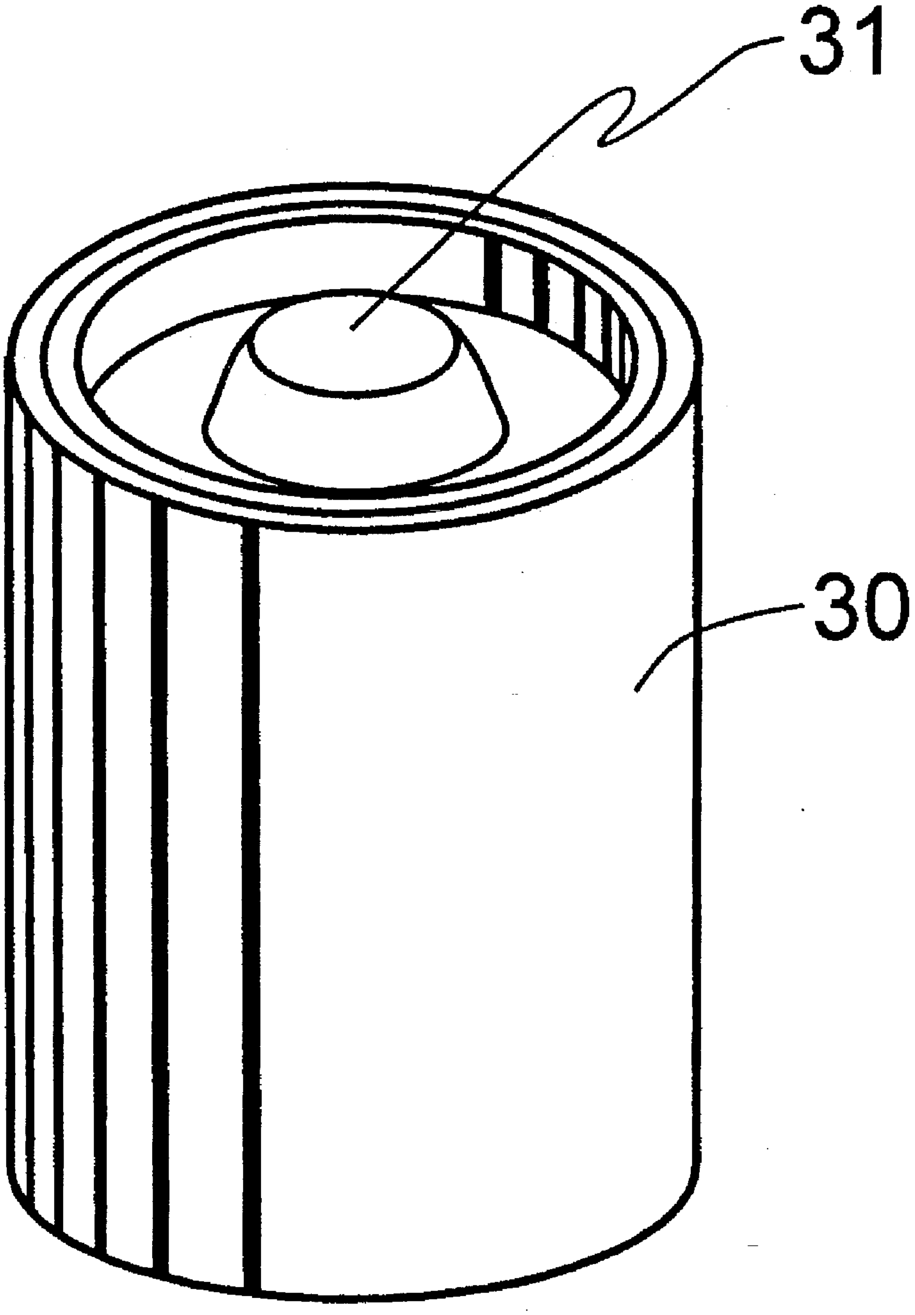
FIG. 2 is a perspective view of the surge absorber shown in FIG. 1.

Referring to FIGS. 1 and 2, a gap-type surge absorbing element 10 contains a discharge tube of the microgap-type having a striking or DC discharge starting voltage of 500 V. Discharge tube has a columnar ceramic body 12 having a length of about 5.5 mm. The surface of discharge tube is covered with a conductive film 11. A pair of cap electrodes 13 and 14, about 0.2 mm thick, cap under pressure the ends of ceramic body 12. A microgap 16 is formed at the circumferential center of ceramic body 12 by laser cutting conductive film 11.

A varistor 20 has a varistor body 21 having a diameter of about 5 mm and a thickness of about 4 mm, and a pair of external electrodes 22 and 23 at its ends. Varistor 20 is preferably a zinc oxide varistor having a varistor voltage of 220 V.

An intermediate electrode 25, of a suitable conductor such as, for example, copper, iron-nickel alloys, iron-nickel-chromium alloys, and iron-nickel-cobalt alloys, is interposed between cap electrode 14 of gap-type surge absorbing element 10 and external electrode 22 of varistor 20. Intermediate electrode 25 preferably has a diameter of about 6.0 mm and a thickness of about 0.3 mm. One surface of intermediate electrode 25 is flat or planar for contacting external electrode 22. The other surface of intermediate electrode 25 includes a recess 25*a* for positioning cap electrode 14 centered therein.

Intermediate electrode 25 extends substantially all the way across the interior of an insulating tube 30. Thus, a discharge occurring in microgap 16 is prevented from propagating along the surface of varistor 20. This improves resistance to follow current. The same effect can be achieved if external electrode 22 of varistor 20, or cap electrode 14 of gap-type surge absorbing element 10 is made large enough to substantially fill the cross section of insulating tube 30.

A insulating tube 30 is sealed at its ends by sealing electrodes 31 and 32. Glass insulating tube 30 has an inside diameter of about 6.2 mm and a length of about 15 mm. Sealing electrodes 31 and 32 have diameters of about 5.9 mm and thicknesses of about 0.2 mm. A recess 31*a* in the inner surface of sealing electrode 31 holds cap electrode 13 centered therein. An inner surface of sealing electrode 32 is flat for contact with external electrode 23. The outer surfaces of sealing electrodes 31 and 32 are formed into convex surfaces to permit securing external lead wires (not shown) thereto.

The embodiment of the invention shown in FIGS. 1 and 2, by eliminating the need for the connection of lead wires between its elements, permits a much more compact surge absorber than is possible with the prior art. Also, the compact nature of the device simplifies manufacture. The compactness of the device conserves precious circuit-board real estate, and permits rapid installation.

Prior-art surge absorbers conventionally require a resin coating, at least on the varistor, for improving environmental resistance. Insulating tube 30 of the present invention, and the inert gas therein, eliminates the need for such resin coating.

The surge absorber of FIGS. 1 and 2 is prepared by the following method.

Sealing electrode 32 is inserted into an end of glass tube 30. Varistor 20 is inserted into the open end of insulating tube 38 with external electrode 23 contacting the inner surface of sealing electrode 32. Intermediate electrode 25 is inserted into glass tube with its flat surface contacting external electrode 22 of varistor 20. Gap-type surge absorbing element 10 is inserted into glass tube 30 with cap electrode 14 fitted into recess 25*a* of intermediate electrode 25. Finally, sealing electrode 31 is inserted into the end portion of glass tube 30 to make contact with cap electrode 13, and to hold the entire device in the assembled condition shown.

Holding gap-type surge absorbing element 10, intermediate electrode 25 and varistor 20 between sealing electrodes 31 and 32 electrically connects these components together. Air in the interior of glass tube 30 is evacuated and is replaced with an inert gas such as, for example, argon gas. Glass tube 30 and sealing electrodes 31 and 32 are heated with a carbon heater (not shown) to melt a sealing material such as, for example, frit or solder, that hermetically seals the ends of glass tube 30.

COMPARATIVE EXAMPLE

Figure 3:
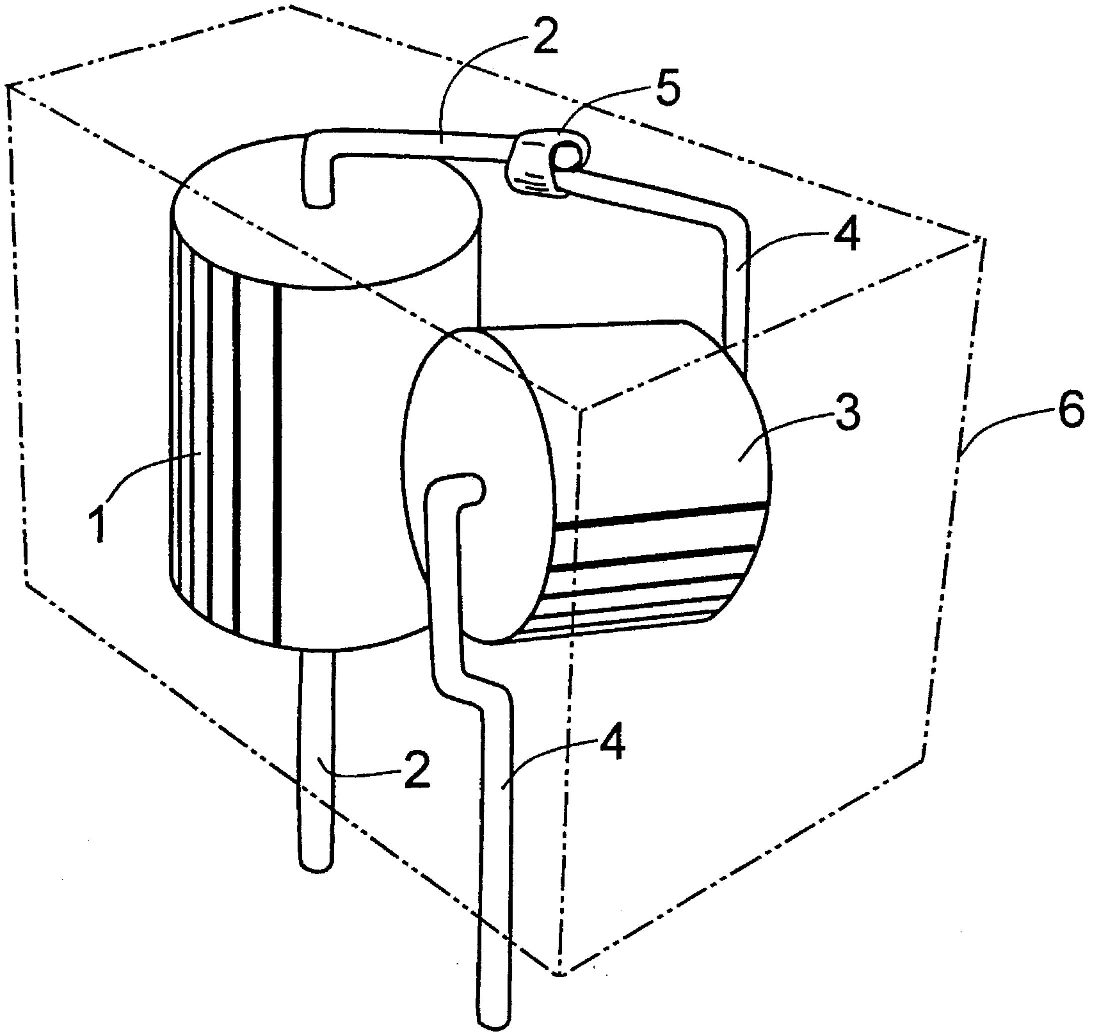
Fig. 3 Prior Art
FIG. 3 is a perspective view of a surge absorber of the prior art.

A comparative example surge absorber was assembled according to the prior art embodiment shown in FIG. 3, comprising a gap-type surge absorbing element 1 and a varistor 3 sealed in a glass tube. Gap-type surge absorbing element 1 has the same construction as in the embodiment of the present invention except that it is sealed in the glass tube and has a lead wire 2, and a DC discharge starting voltage of 500 V. Varistor 3 has the same construction as that in the embodiment of the present invention except that it has a lead wire 4 on the external electrode, and a varistor voltage of 220 V.

Electrical characteristics and volumes of the embodiment and the comparative example were investigated.

In response to an impulse voltage of (1.2×50) μsec–5 kV as an artificial surge voltage, the surge absorbers of both the embodiment and the comparative example started discharge at a voltage of 900 V.

Subsequent measurement of surge capacitance by feeding a surge current of (8×20) μseconds revealed that none of the surge absorbers of the embodiment and of the comparative example were damaged even at a surge current of 1,000 A.

The service life was investigated for the surge absorbers of the embodiment and the comparative example using a pulse test circuit having a capacitor of a DC power source of 10 kV, a resistor of 500 ohms and an electrostatic capacitance of 500 pF. The performance of the embodiment and the comparative example was not degraded even after discharging the capacitor 2000 times through the surge absorbers.

Furthermore, surge voltage was applied with a constant application of 100 VAC, with no occurrence of follow current observed in the surge absorbers of the embodiment and the comparative example.

Finally, measurement of volume of the both surge absorbers demonstrated that, while the surge absorber of the comparative example had a volume of 5,500 $mm^3$, that of the embodiment of the present invention had a volume of 362 $mm^3$, or about a fifteenth that of the comparative example.

These results permitted confirmation of the possibility of building the surge absorber of the present invention into a very compact form while keeping substantially the same electrical characteristics as those in the comparative example.

The gap-type surge absorbing element in the surge absorber of the present invention is not limited to the microgap-type discharge tube presented above, but may be an inert gas filled gap-type discharge tube in which a pair of sealing electrodes at opposed ends of the tube form a gap.

The insulating tube is not limited to a glass tube, but may be a ceramic tube.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A surge absorber, comprising:

a first insulating tube;

a varistor in said first insulating tube;

a second insulating tube centered in said first insulating tube;

first and second conductive portions over said second insulating tube;

a gap between said first and second conductive portions forming a gap-type surge absorbing element;

said gap-type surge absorbing element including first and second cap electrodes at opposed ends of said second insulating tube;

said varistor having first and second external electrodes at opposed ends thereof;

means for electrically connecting said first cap electrode to said first external electrode;

an inert gas in said first insulating tube;

said gap-type surge absorbing element and said varistor being aligned in end to end relationship and axially centered in said first insulating tube;

said means for electrically connecting said first cap electrode to said first external electrode including means for preventing propagation of a discharge from said gap-type surge absorbing element to a surface of said varistor; and first and second sealing electrodes closing and sealing opposed ends of said first insulating tube and retaining said gap-type surge absorbing element and said varistor, as well as said inert gas in said first insulating tube.

2. A surge absorber according to claim 1, wherein said insulating tube is one of glass insulating tube and ceramic insulating tube.

3. A surge absorber according to claim 1, wherein said means for electrically connecting includes an intermediate element interposed between said first cap electrode of said gap-type surge absorbing element and said first external electrode of said varistor.

4. A surge absorber according to claim 3, wherein said intermediate element is made of a material selected from the group consisting of copper, iron-nickel alloys, iron-nickel-chromium alloys, and iron-nickel-cobalt alloys.

5. A surge absorber, comprising:

a first insulating tube;

a varistor in said first insulating tube;

first and second conductive portions over a second insulating tube;

a gap between said first and second conductive portions forming a gap-type surge absorbing element;

said gap-type surge absorbing element including first and second cap electrodes at opposed ends of said second insulating tube;

said varistor having first and second external electrodes at opposed ends thereof;

means for electrically connecting said first cap electrode to said first external electrode;

an inert gas in said first insulating tube;

said means for electrically connecting said first cap electrode to said first external electrode including means for preventing propagation of a discharge from said gap-type surge absorbing element to a surface of said varistor; and first and second sealing electrodes inserted into opposed ends of said first insulating tube, thereby closing, sealing, and retaining said gap-type surge absorbing element, said varistor, and said inert gas in said first insulating tube.

6. A surge absorber, comprising:

a first insulating tube;

a varistor in said first insulating tube;

first and second conductive portions over a second insulating tube;

a gap between said first and second conductive portions forming a gap-type surge absorbing element;

said gap-type surge absorbing element including first and second cap electrodes at opposed ends of said second insulating tube;

said varistor having first and second external electrodes at opposed ends thereof;

means for electrically connecting said first cap electrode to said first external electrode;

an inert gas in said first insulating tube;

a conical recess in said first sealing electrode;

said second cap electrode of said gap-type surge absorbing element being in said conical recess, thereby centering said gap-type surge absorbing element in said first insulating tube;

said means for electrically connecting said first cap electrode to said first external electrode including means for preventing propagation of a discharge from said gap-type surge absorbing element to a surface of said varistor; and first and second sealing electrodes inserted into opposed ends of said first insulating tube, thereby closing, sealing, and retaining said gap-type surge absorbing element, said varistor, and said inert gas in said first insulating tube.

7. A surge absorber, comprising:

a first insulating tube;

a varistor in said first insulating tube;

first and second conductive portions over a second insulating tube;

a gap between said first and second conductive portions forming a gap-type surge absorbing element;

first and second cap electrodes at opposed ends of said second insulating tube;

said varistor having first and second external electrodes at opposed ends thereof;

an inert gas in said first insulating tube;

an electrically conductive intermediate element between said gap-type surge absorbing element and said varistor;

said intermediate element extending substantially all the way across an interior cross-section of said first insulating tube, whereby a gas plasma generated across said gap is prevented from migrating into short circuiting contact with a surface of said varistor;

a first conical recess in said intermediate element;

said second cap electrode in said first conical recess, thereby axially centering said gap-type surge absorbing element in said first insulating tube; and first and second sealing electrodes inserted into opposed ends of said first insulating tube, pressing axially inward on a stack consisting of said varistor, said intermediate element, and said gap-type surge absorbing element, thereby closing, sealing, and retaining said gap-type surge absorbing element, said varistor, said intermediate element, and said inert gas in said first insulating tube.

8. A surge absorber according to claim 7, further comprising a second conical recess in said first sealing electrode; and said first cap electrode in said second conical recess, thereby axially centering said gap-type surge absorbing element in said first insulating tube.

9. A surge absorber, comprising:

a first insulating tube;

a varistor in said first insulating tube;

a second insulating tube centered in said first insulating tube;

first and second conductive portions over said second insulating tube;

a gap between said first and second conductive portions forming a gap-type surge absorbing element;

first and second cap electrodes at opposed ends of said second insulating tube;

said varistor having first and second external electrodes at opposed ends thereof;

an electrically conductive intermediate element between said gap-type surge absorbing element and said varistor;

an inert gas in said first insulating tube;

said intermediate element extending substantially all the way across an interior cross-section of said first insulating tube, whereby a gas plasma generated across said gap is prevented from migrating into short circuiting contact with a surface of said varistor;

a first conical recess in said first sealing electrode;

a second conical recess in said intermediate element;

said gap-type surge absorbing element axially centered in said first and second conical recesses;

said varistor including means for axially centering in said first insulating tube; and first and second sealing electrodes inserted into opposed ends of said first insulating tube, pressing axially inward on a stack consisting of said varistor, said intermediate element, and said gap-type surge absorbing element, thereby closing, sealing, and retaining said gap-type surge absorbing element, said varistor, said intermediate element, and said inert gas in said first insulating tube.

* * * * *